United States Patent [19]

Hesse et al.

[11] Patent Number: 5,414,043
[45] Date of Patent: May 9, 1995

[54] CURABLE MOLDING MATERIAL

[75] Inventors: Anton Hesse, Weinheim; Albin Berger, Ludwigshafen; Walter Heckmann, Weinheim; Roger Klimesch, Alsbach-Haehnlein, all of Germany

[73] Assignee: BASF Aktiengesellschaft, Ludwigshafen, Germany

[21] Appl. No.: 134,030

[22] Filed: Oct. 12, 1993

[30] Foreign Application Priority Data

Oct. 12, 1992 [DE] Germany .................. 42 34 324.0

[51] Int. Cl.$^6$ .................. C08L 63/10; C08L 67/06; C08L 75/16
[52] U.S. Cl. .................. 525/64; 525/65; 525/66; 525/108; 525/112; 525/113; 525/119; 525/125; 525/126; 525/131; 525/166; 525/169; 525/170
[58] Field of Search .................. 525/169, 170, 166, 64, 525/65, 66, 125, 126, 131, 108, 112, 113, 119

[56] References Cited

U.S. PATENT DOCUMENTS

| | | |
|---|---|---|
| 3,993,710 | 11/1976 | Alberts . |
| 4,048,257 | 9/1977 | Stevenson .................. 525/169 |
| 4,161,471 | 7/1979 | Kassal . |
| 4,299,927 | 11/1981 | Dombroski .................. 525/64 |

FOREIGN PATENT DOCUMENTS

| | | |
|---|---|---|
| 0274273 | 7/1988 | European Pat. Off. . |
| 1241983 | 12/1967 | Germany . |
| 2305246 | 9/1973 | Germany . |
| 2408898 | 8/1975 | Germany . |
| 2410083 | 9/1975 | Germany . |
| 2449785 | 4/1976 | Germany . |
| 1502233 | 2/1979 | United Kingdom . |

*Primary Examiner*—Patricia A. Short
*Attorney, Agent, or Firm*—Oblon, Spivak, McClelland, Maier & Neustadt

[57] ABSTRACT

A curable molding material comprises a coherent phase of a free-radical curable, unsaturated polyester resin in which finely particulate polyolefin particles are dispersed as disperse phase, the two phases being chemically bound to one another at the interfaces by ionic bonds.

15 Claims, 1 Drawing Sheet

CURABLE MOLDING MATERIAL

The invention relates to a heat-curable molding material based on an unsaturated polyester resin comprising finely particulate polyolefin particles in disperse form.

Molding materials based on fiber-reinforced unsaturated polyester resins are increasingly used in the production of molded parts, especially in automobile construction. They are mainly processed in the form of thickened, sheetlike semi-finished products, known as sheet molding compounds (SMCs) or as dough-like molding materials, known as bulk molding compounds (BMCs). In both cases an unsaturated polyester resin is used as starting material, and is mixed with reinforcing fibers, fillers, free-radical initiators and other additives. The molding materials are processed by compression molding or extrusion at relatively low temperatures of around 130° to 160° C., enabling even complicated molds to be filled without any difficulty. The resultant molded parts have an excellent surface if shrinkage-reducing thermoplastics have been added to the molding materials.

German Patent Applications P 41 24 952.6 and P 42 17 914.9 describe processes for producing curable molding materials based on dispersions of polyolefin particles in unsaturated polyester resins, in which the melt of an unsaturated polyester and the melt of a propylene polymer or of an ethylene polymer are brought together, the liquid mixture is subjected to a shear force field, and a vinyl monomer is added. Such molding materials can be cured to give moldings having a good toughness and only a slight tendency to shrink. However, the dispersions of the solid polyolefin particles in the liquid resin have a limited storage life, and after only a few weeks or even days a phase separation occurs and the dispersion starts to cream since the polyolefin particles tend to reagglomerate. Furthermore, the tendency of the cured molding materials to shrink is still too marked to meet very stringent requirements.

It is an object of the present invention to obviate these disadvantages.

SUMMARY OF THE INVENTION

We have found that this object is achieved by effecting a chemical bonding of the disperse polyolefin phase at the interface of the coherent polyester phase.

The present invention accordingly relates to a curable molding material comprising
  A. as coherent phase, a free-radical curable, unsaturated polyester resin, and
  B. as disperse phase, finely particulate polyolefin particles,
the phases A and B being chemically bound to one another at the interfaces by ionic bonds.

Preferably, the coherent phase A comprises a polymer or oligomer carrying acidic groups, and the disperse phase B comprises a polymer or oligomer carrying amino groups, the reactive groups at the interface forming an ionic bond.

DETAILED DESCRIPTION OF THE PREFERRED EMBODIMENTS

Figure 1:
FIG. 1: A scanning electron microscope photograph of a cured polyester resin containing sytrene as a comonomer.
Figure 2:
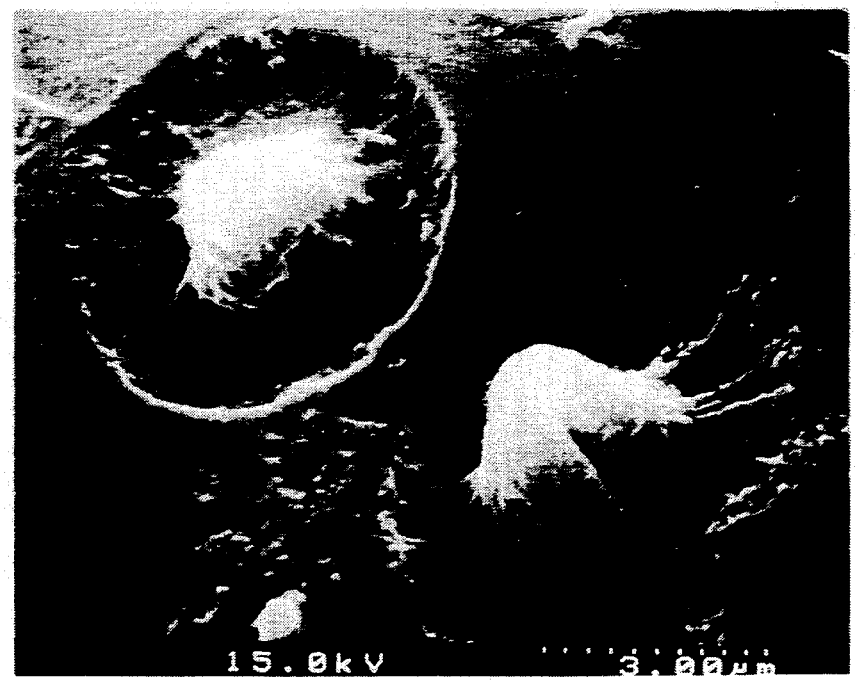
FIG. 2: A scanning electron microscope photograph of a cured polyester resin containing a non-styrene comonomer.

According to DE-A 12 41 983 polyester molding materials are prepared by mixing a styrene solution of an ethylene/vinyl acetate copolymer with a styrene solution of an unsaturated polyester and with a peroxide. Such oil-in-oil emulsions tend to undergo phase separation however, which causes problems in their processing. This also applies to the SMC and BMC compositions according to U.S. Pat. No. 4,161,471, which are elasticized by adding a chloroprene or ethylene/propylene rubber. The ethylene/propylene copolymers are first of all thermally decomposed in a complicated process, then made into a paste with styrene and mixed with a polyester resin paste, the end result being an oil-in-oil emulsion.

DE-A 23 05 246 relates to an unsaturated polyester resin composition that contains, in disperse form, a pulverulent olefin polymer onto which is grafted a vinyl or acrylic monomer. This olefin polymer is prepared in a complex manner by irradiation of polyethylene powder with electron beams, dispersion in water, addition of styrene, polymerization, and filtering and drying of the resultant graft copolymer, which is finally stirred into a solution of an unsaturated polyester in styrene. The storage stability of such dispersions is unsatisfactory, and a chemical bonding of the phases to one another is not to be expected.

DE-B 24 08 898, DE-B 24 10 083 and DE-A 24 49 785 describe a process for preparing free-flowing, stable dispersions of ethylene polymers in styrene solutions of unsaturated polyesters. An ethylene polymer, for example high pressure polyethylene, is dissolved at elevated temperature in styrene, this solution is combined with a styrene solution of the unsaturated polyester under the action of strong shear forces, and the mixture is stirred in the presence of conventional dispersants until a low-viscosity, free-flowing state has formed. However, the aforementioned conventional dispersants do not contain any reactive groups that would permit a chemical bonding of the disperse polyethylene phase to the coherent polyester phase. Accordingly, in this case too the tendency of the cured molding materials to shrink is still relatively high and the crack sensitivity under impact stress is considerable.

The following should specifically be said regarding the individual components:

Unsaturated polyesters contain

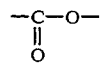

and —CH=CH— groups.

1. Preference is given to unsaturated polyesters (UP) in the stricter sense. These are condensation products of polybasic, in particular dibasic, carboxylic acids and their esterifiable derivatives, in particular their anhydrides, which are coupled with polyhydric, in particular dihydric, alcohols to form esters, and which if desired comprise additional radicals of monobasic carboxylic acids or monohydric alcohols, at least a proportion of the starting materials having to have ethylenically unsaturated, copolymerizable groups.

The acid value of the unsaturated polyester resin should be from 10 to 100, in particular from 15 to 60. Particularly preferred are polyester resins formed from maleic acid, if desired together with o-phthalic acid on the one hand, and diols, such as dipropylene glycol, diethylene glycol and/or 1,2-propanediol on the other hand.

2. Vinyl ester resins (VE resins) are also suitable. A characteristic feature of this class of resins is that they contain the group

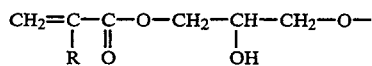

where R is H or $CH_3$.

VE resins, which are also termed epoxy acrylates, are generally understood to be reaction products of polyepoxides with unsaturated monocarboxylic acids, preferably with methacrylic acid. These resins are described for example in GB-A 1 006 587 and in U.S. Pat. Nos. 3,066,112 and 3,179,623, VE resins based on bisphenol A preferably being used. These resins are extremely tough and have a good resistance to chemicals, with a limited heat resistance. On the other hand vinyl ester resins formed from epoxy novolak resins and (meth)acrylic acid, as are described for example in U.S. Pat. No. 3,256,226, have higher heat resistances but lower strengths.

In addition to conventional VE resins, carboxyl-modified variants may also advantageously be used. Such variants can readily be prepared by reacting the hydroxyl groups of VE resins with dicarboxylic anhydrides, for example maleic anhydride, o-phthalic anhydride or tetrahydrophthalic anhydride, monoester structures being formed by ring opening.

3. Vinyl ester urethane resins (VU resins) are known, for example from U.S. Pat. No. 3,297,845, U.S. Pat. No. 3,772,404, U.S. Pat. No. 4,618,658, GB-A 2 217 722 and DE-A 37 44 390. VU resins generally contain the following groups:

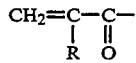 a)

(where R is H or $CH_3$).

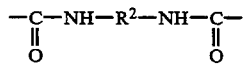 b)

(where $R^2$ is a divalent aliphatic, aromatic or cycloaliphatic radical having 4 to 40 carbon atoms, preferably an aromatic radical having 6 to 20 carbon atoms), and if desired c) —O—$R^3$—O— (where $R^3$ is a divalent aliphatic, cycloaliphatic or aromatic radical having 2 to 500 carbon atoms, preferably an aliphatic radical having 4 to 100 carbon atoms), and also if necessary d) —NH—$R^4$—NH— (where $R^4$ is an aliphatic, cycloaliphatic or aromatic radical having 2 to 100 carbon atoms).

Preferably, the VU resin is a reaction product of
a polyfunctional isocyanate,
if desired a polyhydric alcohol,
if desired a polyvalent amine,
a hydroxyalkyl (meth)acrylate,
the weight ratio of isocyanate to (alcohol+amine) in the reaction being from 100:0 to 100:300 and the equivalent ratio of hydroxyalkyl (meth)acrylate to the free isocyanate groups of the reaction product being from 3:1 to 1:2.

The coherent phase A preferably comprises, in addition to the unsaturated polyester resin, conventional vinyl or allyl comonomers, for example styrene, vinyltoluene, methyl methacrylate, hydroxyethyl methacrylate, hydroxypropyl methacrylate, trimethylolpropane trimethacrylate, diallyl phthalate or diallyl isophthalate in amounts of up to 60% by weight, preferably from 20 to 50% by weight, based on A, and also usual inhibitors in amounts of from 0.001 to 0.2% by weight, based on A.

In accordance with the invention the coherent phase comprises a polymer or oligomer carrying acidic groups, preferably carboxyl groups. UP resins in the strict sense generally themselves carry carboxyl terminal groups in sufficient amount. In the case of the conventional VE and VU resins, and also in the case of UP resins with low acid values, oligomers or polymers carrying acidic groups and compatible with the resin have to be added in amounts of from 2 to 50% by weight, preferably from 5 to 25% by weight, based on A. Preference is given to copolymers of vinyl acetate with (meth)acrylic acid, maleic acid, a maleic monoester, vinylsulfonic acid or vinylphosphonic acid, and also saturated polyesters or unsaturated polyesters, in particular those having acid values of greater than 20.

Preferred polyolefins of the disperse phase B are ethylene and propylene polymers, though in principle the invention can also be implemented with higher polyolefins, such as polybutene or polyisobutene.

For the purposes of the present invention ethylene polymers are homopolymers of ethylene and copolymers comprising less than 50 mol %, in particular from 0 to 40 mol %, of conventional comonomers. Suitable comonomers include α-olefins having 3 to 8 carbon atoms, such as propylene, isobutene and 1-butene. Furthermore, also suitable are vinyl esters of organic carboxylic acids having 1 to 19 carbon atoms, preferably vinyl acetate, vinyl halides such as vinyl chloride, (meth)acrylic acid, their esters containing 1 to 8 carbon atoms in the alcohol component, their nitriles and amides, for example methyl methacrylate, ethyl acrylate, butyl acrylate, (meth)acrylonitrile, and unsubstituted or substituted (meth)acrylamide. Graft copolymers too are suitable, for example those with maleic anhydride as graft comonomer.

High-pressure polyethylene is preferred as ethylene polymer, though polyethylene types prepared by the low-pressure method are also very suitable.

The melt flow index values of the ethylene polymer measured according to DIN 53 735 at 190° C. and 2.16 kg load are preferably in the range from non-flowable up to 1,000 [g/10 min]; preferably polyethylene types having melt flow index values of from 1 to 40 are used.

The DSC melting points measured according to ISO 3146 are preferably below 136° C., in particular from 90° to 135° C.

Mixtures of different ethylene polymers may also be used, the components being able to differ substantially as regards their molecular weight, polarity and melting point. Also, the starting materials may be blends of ethylene polymers with minor amounts of other thermoplastics, for example polypropylene, in particular a low molecular weight, thermally degraded polypropylene, or a polypropylene grafted with maleic anhydride.

Propylene polymers are preferably partly crystalline, and their crystallite melting point should be higher than 125° C., preferably higher than 155° C. Particularly suitable are low molecular weight polymers having a melt flow index value (MFI) of more than 10, preferably of from 20 to 150 g/10 min (at 230° C. and 2.16 kg load).

Preference is given to polypropylene prepared by polymerizing propylene in the presence of a Ziegler-Natta catalyst system.

Also suitable are copolymers prepared by random copolymerization of propylene with ethylene, 1-butene, 1-pentene, 3-methyl-1-pentene, 1-hexene, 1-heptene or 1-octene, or dienes, for example norbornadiene or dicyclopentadiene, having a propylene content of greater than 50 mol %.

According to the invention the disperse phase B comprises a polymer or oligomer preferably carrying aliphatic amino groups.

These amino groups may be incorporated directly into the polyolefin. Such polyolefins carrying aliphatic amino groups may be prepared for example by grafting the polyolefin with maleic anhydride and then reacting the free carboxyl group with an organic diamine, for example 2-dimethylaminoethylamine or dimethylneopentanediamine.

However, it is preferred if the disperse phase comprises from 1 to 40% by weight, preferably from 2 to 30% by weight, of an oligomeric or polymeric dispersant C carrying aliphatic amino groups. This dispersant acts as an emulsifying agent during the melt dispersion, leads to small particle diameters, and prevents a reagglomeration, which would cause the thermoplastic phase to settle out. The particularly good effect is due to the fact that the amino groups at the phase interface form an ionic bond with the acidic groups of the unsaturated polyester resin. A further advantage of the ionic bond is the resultant excellent phase adhesion in the cured molding material.

Various classes of substances may be used as the dispersant C:

1. Particularly effective are waxy copolymers of ethylene with from 2 to 50% by weight, preferably from 5 to 40% by weight, of a comonomer carrying aliphatic amino groups. The molecular weight ($M_w$) of the copolymer is preferably from 2,000 to 80,000, in particular from 13,000 to 40,000. Suitable comonomers are in particular acrylates and methacrylates carrying amino groups, and also vinylimidazole and 1-vinyl-2-methylimidazole. Preferred comonomers are dimethylaminoethyl acrylate and diethylaminoethyl acrylate. Besides these amino comonomers, the copolymer may also comprise other conventional monomers such as (meth)acrylates, vinyl esters and vinyl ethers incorporated by polymerization. The ethylene copolymers are prepared according to known methods by free-radical initiated high-pressure bulk polymerization at from 500 to 5,000 bar and from 180° to 280° C., the desired molecular weight being able to be set by conventional regulators such as hydrogen, hydrocarbons or aldehydes.

2. Also suitable are copolymers or graft copolymers of ethylene or propylene with functional groups that are reacted with an aliphatic diamine. Examples include copolymers of ethylene or propylene with methyl methacrylate, acrylic acid or glycidyl methacrylate, preference being given to a graft copolymer of polypropylene with from 0.1 to 15% by weight of maleic anhydride, which is reacted, with the formation of a monoamide, with a diamine that carries a tertiary and a secondary or primary aliphatic amino group. 2-Methylaminoethylamine is preferred as diamine.

3. In principle polydienes with aliphatic amino terminal groups are also suitable, for example the commercially available amino-terminated butadiene/acrylonitrile rubber.

4. Further suitable dispersants C are copolymers of vinyl monomers, for example styrene and (meth)acrylates with comonomers carrying amino groups, for example dimethylaminoethyl acrylate.

5. A further highly suitable class of substances are Michael adducts of aliphatic primary or secondary amines at the double bonds of UP, VE or VU resins. Depending on the molar ratio of double bond to amine, amino-containing oligomers or polymers are formed that contain a certain number of double bonds or else none at all. Preference is given to adducts of secondary aliphatic or cyclic amines with UP resins having a high styrene compatibility (greater than 20 g of styrene per 1 g of UP resin). Particularly suitable amines are methylcyclohexylamine, dibutylamine, pyrrolidine and piperidine. UP resins having a high styrene compatibility are those comprising alkyl-branched or cycloaliphatic building blocks, for example neopentyl glycol, dipropylene glycol, hydrogenated bisphenol A on the one hand, and dicyclopentadiene, endomethylenetetrahydrophthalic acid, 2-ethylhexanoic acid or stearic acid on the other hand.

In the dispersion the coherent phase A is preferably present in liquid form, while the disperse phase B is present in the form of finely particulate particles having a mean diameter (number average) of from 1 to 100 $\mu$m, preferably from 3 to 30 $\mu$m. If the addition of vinyl monomers to the UP resin A is dispensed with, then free-flowing granules having a disperse polyolefin phase can also be produced. In this case preference is given to UP resins that crystallize.

In order to prepare the dispersion according to the invention the polyolefin is uniformly distributed at temperatures above its melting point in the unsaturated polyester resin. This distribution can be effected with any suitable mixing equipment, and is preferably performed in an extruder or a stirred vessel having internal or external mixing equipment.

a) Extruder process

The olefin polymer is melted, preferably at from 120° to 240° C., in an extruder, for example a double-screw extruder. A melt, preferably at from 100° to 150° C., of the unsaturated polyester, which preferably comprises the dispersion stabilizer C, is supplied through a side extruder or by means of a pump. The residence time of the melt in the extruder is preferably from 20 to 300 sec. The melts are mixed in a shear force field, the polyolefin thereby being split up into fine droplets. Since the splitting up takes place in the melt, round, spherical particles having a smooth surface are formed, which remain in this form as a disperse phase in the coherent polyester phase even when the melt cools. The cooling to temperatures below the crystallite melting point of the polyolefin occurs while the melt is still in the extruder, with the result that a dispersion of solid polyolefin particles in the liquid unsaturated polyester is discharged from the extruder. This dispersion is then either mixed directly with a comonomer or cooled further, by extruding it for example into water, or the melt is granulated. The dry, nonblocking granules can be stored and dissolved as needed in the comonomer. In both cases a storable dispersion is obtained of the finely particulate polyolefin B in a solution A of the unsaturated polyester in the comonomer. The extruder process is advantageously used in the case of high melting point polyolefins, for example polypropylene.

b) Stirred vessel process

The mixing, according to the invention, of the polyester melt with the polyolefin melt can also take place in conventional stirred vessels that are equipped with a powerful stirrer. The mixing is preferably carried out in a batchwise manner. This process is advantageously employed when the crystallite melting point of the polyolefin is low, for example in the case of polyethylene.

The polyolefin can be added either as a melt or— preferably —as granules or as grit to the stirred vessel together with the melt of the unsaturated polyester (which preferably comprises a dispersant C). The melt temperature in the stirred vessel is from 80° to 220° C., preferably from 110° to 200° C., and the residence time is from 10 to 120 minutes, preferably from 20 to 40 minutes. After completion of the dispersion process the melt is removed from the vessel. Although it can be granulated, it is preferably then mixed with the comonomer. This can be effected either by adding the necessary amount of monomer to the stirred vessel and stirring it with the melt, or by adding the melt to a downstream stirred vessel containing monomer, which is preferably heated to from 40° to 90° C. In this case too a dispersion is formed of the polyolefin particles in the unsaturated polyester resin.

This dispersion can now be stored for several weeks, even months, without separation occurring.

The dispersion according to the invention can be mixed with conventional additives D and a semi-finished product can be prepared in this way.

The additives D are conveniently mixed with the fluid dispersion in two stages. First of all shrinkage-reducing thermoplastics, inhibitors, accelerators, viscosity-reducing agents and waxes are added if necessary, in each case conveniently dissolved or dispersed in the comonomer. The resultant dispersion is extremely free-flowing and storable. In exceptional cases, namely when the dispersion contains a high content of polyolefin, it is a paste, which has to be slightly heated before it can be processed further. The free-radical initiator is then added shortly before the further processing, if desired together with fillers, fibers, mold release agents, lubricants and thickeners. If it is desired to prepare SMC materials, the composition together with reinforcing fibers is shaped into a sheetlike semi-finished product and thickened.

The semi-finished product is in the form of a sheetlike, resin-impregnated fiber mat (SMC), dough-like injection molding material (BMC) containing short fibers, free-flowing compression molding material, resin-impregnated fiber roving, or in the form of a resin-impregnated fiber structure (RTM). The further processing may accordingly be carried out according to various methods: sheet molding compounds are shaped in presses, bulk molding compounds are shaped by injection molding, resin-impregnated rovings are shaped by filament winding, and fiber structures are shaped in closed molds. The curing of the unsaturated polyester resin, ie. the copolymerization with the comonomer, takes place during or after the shaping, at above 50° C., preferably from 120° to 170° C.

In this connection two cases have to be distinguished:

a) In the case of polyester resins that cure to form moldings having a glass transition temperature above 120° C. and especially when styrene is used as comonomer, the disperse phase consolidates during the curing to form particles having a hollow spherical structure. Since polystyrene has an approximately 17% smaller volume than styrene monomer, the coherent phase shrinks during the polymerization. Since the disperse phase is now joined to the coherent phase by ionic bonds, the system ruptures at the weakest point, namely in the interior of the polyolefin particles, with the formation there of cavities, as can be seen in the accompanying scanning electron microscope photograph X. The volume contraction of the coherent phase is compensated by the formation of the cavities. This hypothetical consideration provides an explanation for the extremely good shrinkage compensation in the molding materials according to the invention.

b) In the case of non-styrene comonomers and polyester resins that cure to form moldings having glass transition temperatures below 120° C., such hollow spherical structures are seldom formed. However, elongated shreds and fibers of the polyolefin particles are formed at the fracture surfaces, which can be attributed to the chemical bonding of the phases. This can be seen in the scanning electron microscope photograph Y. This consideration provides an explanation for the good tough modification achieved in the molding materials according to the invention.

In both cases therefore the ionic bonds at the interfaces of the two phases A and B still remain even after the curing and effect a good mutual adhesion of the phases.

The cured molded parts according to the invention can be used in automobile construction, and in the building and electrical sectors.

The parts and percentages given in the Examples are parts and percentages by weight.

EXAMPLES

A) Unsaturated polyester resins

UP resin A1

An unsaturated polyester with an acid value of 36 was prepared by condensation of maleic anhydride, o-phthalic anhydride, propylene glycol and dipropylene glycol in a molar ratio of 1:0.2:0.95:0.3. The product contained 200 ppm of hydroquinone and 1,000 ppm of triphenyl phosphite to effect stabilization. The condensation took place under nitrogen. The melt viscosity of the polyester was 720 [mPa.s] at 150° C.

UP resin A2

An unsaturated polyester with an acid value of 42 was prepared by condensation, under nitrogen, of maleic anhydride, o-phthalic anhydride, propylene glycol and dipropylene glycol in a molar ratio of 1:0.3:0.95:0.4. The polyester contained 200 ppm of hydroquinone and 1,000 ppm of triphenyl phosphite to effect stabilization. The melt viscosity was 550 [mPa.s] at 150° C.

UP resin A3

An unsaturated polyester with an acid value of 35 and a melt viscosity of 490 [mPa.s] (150° C.) was prepared by condensing maleic anhydride and dipropylene glycol in a molar ratio of 1:1. The polyester was stabilized with 225 ppm of methylhydroquinone and 500 ppm of triphenyl phosphite.

UP resin A4

An unsaturated polyester with an acid value of 50 and a melt viscosity of 480 [mPa.s] (150° C.) was prepared by condensing maleic anhydride, o-phthalic anhydride and propylene glycol in a molar ratio of 1:0.5:1.5. The polyester was stabilized with 50 ppm of hydroquinone.

VE resin A5

380 parts of a diglycidyl ether of bisphenol A with an epoxy equivalent weight of 188 (Epikote ® 828 from Shell) were reacted with 172 parts of methacrylic acid at 110° C. in the presence of 0.5% of tetramethylammonium chloride as catalyst and 0.1% of hydroquinone as inhibitor. After 5 hours an epoxy value of 0.025, an acid value of 11, and a melt viscosity at 125° C. of 305 [m. Pas] were reached. 306 parts of o-phthalic anhydride were now added at 110° C. The reaction mixture was stirred for 120 minutes and 0.03 part of dimethylquinone as inhibitor was then added, followed by 546 parts of styrene. A clear resin solution was formed, having a viscosity of 249 m. Pas] (23° C.).

B) Polyolefins

B1: Ethylene homopolymer with a melt flow index MFI (190/2.16): 36 [g/10 min] (according to DIN 53 735), melting point (DSC) 112° C. (according to ISO 3146), and density 0.924 [g/cm³] (according to DIN 53 479A).

B2: Ethylene homopolymer with a melt flow index MFI (190/2.16): 20 [g/10 min], melting point (DSC) 106° C., and density 0.916 [g/cm³].

B3: Ethylene homopolymer with a melt flow index MFI (190/2.16): 18 [g/10 min], melting point (DSC) 132° C. and density 0.954 [g/cm³].

B4: Propylene homopolymer with a melt flow index MFI (230/2.16): 70 [g/10 min], melting point (DSC) 162° C. and density 0.904 [g/cm³].

C) Dispersants

C1–C3: Polyethylene waxes with aliphatic amino groups

C1: 12.0 kg/hour of ethylene and 0.6 l/hour of dimethylaminoethyl acrylate were continuously polymerized at 1,500 bar and 240° C. in a stirred, 1 liter capacity autoclave having a L/D ratio of 5. The desired molecular weight of about 25,000 was set by metering in propionaldehyde. 3.6 kg of product were removed per hour. The comonomer content was 12.5%, and the viscosity according to DIN 51 562 was 4,500 [cSt]. (Ubbelohde, 120° C.).

C2: 16.0 kg/hour of ethylene and 0.75 l/hour of dimethylaminoethyl acrylate were continuously polymerized at 1,500 bar and 200° C. The desired molecular weight of about 25,000 was set by metering in propionaldehyde. 2.3 kg of product were removed per hour. The comonomer content was 20.8%, and the Ubbelohde viscosity (at 120° C.) was 5,040 [cSt].

C3: 11.5 kg/hour of ethylene and 0.4 l/hour of dimethylaminoethyl acrylate were continuously polymerized at 1,500 bar and 240° C. The desired molecular weight of about 45,000 was set by metering in propionaldehyde. 3.2 kg of product were removed per hour. The comonomer content was 8.5%, and the Ubbelohde viscosity was 4,820 [cSt].

C4: Michael adduct of unsaturated polyester and pyrrolidine

An unsaturated polyester with an acid value of 28 was prepared in a two-stage process, equimolar amounts of dicyclopentadiene and maleic acid being reacted in the first stage at from 125 to 135° C. to form the maleic monoester, followed by condensation with ethylene glycol at 190° C. in the second stage. The starting substances were used in a molar ratio of maleic acid:dicyclopentadiene:ethylene glycol of 1:1:0.55. 100 ppm of hydroquinone were added during the condensation to effect stabilization.

67.4 parts of pyrrolidine were added to 246 parts of this unsaturated polyester in a stirred vessel under nitrogen at 80° C. over 35 minutes. The reaction mixture was kept for 2.5 hours at this temperature and the melt was then cooled. H NMR spectroscopic comparison showed that the UP double bonds had been quantitatively converted by amine addition.

C5: Vinyl polymer with aliphatic amino groups

To prepare the polymer, a mixture of a saturated adipic acid polyester (acting as diluent) was polymerized with a vinyl monomer mixture. 60 parts of a saturated polyester of adipic acid, ethylene glycol and propylene glycol with an acid value of 8 and a melt viscosity of 1,800 [mPa.s] were admixed in a stirred vessel under nitrogen with 20 parts of styrene, 10 parts of stearyl methacrylate and 10 parts of 2-dimethylaminoethyl acrylate and heated to 85° C., 0.03 part of tert-butyl perbenzoate was then added, and the temperature was raised to 120° C. After two hours at this temperature a further 0.03 part of tert-butyl perbenzoate was added, and the reaction mixture was kept for one hour at 120° C. and then cooled.

Example 1 a) Preparation of a dispersion 40.4 parts of UP resin A1 were heated to 180° C. under nitrogen in a vessel equipped with an anchor stirrer, and 1.9 parts of dispersant C1 were added, followed over 15 minutes by the portionwise addition of 21.1 parts of ethylene polymer B1 in granule form. After stirring for 25 minutes at 230 r.p.m., the reaction mixture was cooled from 180° C. to 125° C. and diluted a little at a time with 36.7 parts of styrene, in which 0.093 part of 2,6-dimethylquinone as inhibitor had been dissolved. After cooling to 25° C., a finely particulate polyethylene dispersion was obtained having a viscosity of 3,080 [mPa.s] (23° C.) and particle diameters of from 3 to 20 μm.

b) SMC preparation and testing

The following resin/filler paste was prepared using a high-speed stirrer:

| | |
|---|---|
| 100 | parts of dispersion 1a |
| 18 | parts of styrene |
| 1.5 | parts of tert-butyl perbenzoate |
| 4.5 | parts of zinc stearate |
| 1.75 | parts of MgO paste (Luvatol ® MK 35) |
| 180 | parts of filler chalk (Millicarb ®) |

100 parts of dispersion 1a

The SMC preparation was carried out in a pilot plant, in which the resin/filler mixture was combined with cut glass fiber rovings (2.5 cm long) on a polyethylene film, rolled up, and stored for 4 days at 23° C. The cover films were then removed and the tack-free SMC was press-molded in a polished steel mold for 5 minutes under 50 bar at 145° C. into 4 mm thick sheets with a glass fiber content of 30%. Table 1 shows the properties of a molded material prepared from SMC 1b.

The falling ball test is carried out as follows. Test specimens (80×80 mm) are taken from 4 mm thick molded sheets and clamped between metal rings (diameter 60 mm), and a steel ball (761 g, diameter: 57.1 mm) is then allowed to drop onto the sheet from a height of 70 cm. The tension side of the damaged test specimen is sprayed with a red dye solution (Diffusion Red from H. Klumpf), washed with water after 5 minutes and dried, and the diameter of the red damage zone is measured. A cut is made through the middle of the damage zone and the thickness of the red zone is measured at the cut surface (magnifying glass with scale). The smaller the numerical values of the two measurement quantities, the less sensitive the molded materials are to shock or impact.

TABLE 1

|  | Molded material of SMC 1b |
|---|---|
| Modulus of elasticity (according to EN 63) [N/mm²] | 13,000 |
| Impact strength (23° C.) (according to DIN 53 453) [kJ/m²] | 112 |
| Falling ball test | |
| Damage depth [mm] | 1.5 |
| Damage zone [mm] (diameter) | 15 | c) Phase adhesion in the molded material

The following mixture was prepared from the dispersion 1a:

| 100 parts of dispersion 1a |
| 3 parts of silicon dioxide (Aerosil ®) |
| 1.5 parts of tert-butyl perbenzoate |

The paste was press-molded in a steel mold (roundel 60 mm in diameter and 4 mm deep) for 10 minutes at 145° C. under 200 bar. The scanning electron microscope photograph of a fracture surface of the molded material shows the excellent bonding of the disperse polyethylene phase (hollow sphere) to the coherent UP resin matrix.

Example 2 a) Preparation of a dispersion 48.2 parts of UP resin A2 were heated under nitrogen to 160° C. in a vessel equipped with an anchor stirrer, 2.07 parts of dispersant auxiliary C1 were added, and the stirring speed was set to 230 r.p.m. 20 parts of polyethylene granules B1 were now added in portions, the mixture was stirred for 20 minutes at 160° C. and was then slowly cooled to 106° C. The addition of 29 parts of styrene containing 0.03 part of 2,6-dimethylquinone for the purposes of stabilization was now commenced at this temperature. A finely particulate polyethylene dispersion having a particle size distribution of from 2 to 5 μm was obtained, which did not cream even when stored for many weeks at 23° C.

b) Preparation of a molded material 70 parts of dispersion 2a were catalyzed with 1.4 parts of methyl ethyl ketone peroxide (MEKP, LA 3), 0.7 part of a cobalt accelerator (1% of Co) and 0.7 part of biscyclohexyl peroxydicarbonate (Perkadox 16), and stored in a polyethylene beaker (75 mm deep, 60 mm wide) at 60° C. A white molded material without the slightest signs of cracking was formed.

For the purposes of comparison UP resin A2 was dissolved in styrene to give a 70% strength solution and stabilized with 50 ppm of 2,6-dimethylquinone. 70 parts of this clear resin were catalyzed as described above and stored at 60° C. A transparent molded material that was completely destroyed by numerous cracks was formed.

Examples 3 to 6 and Comparative Examples a) Preparation of the dispersions

The unsaturated polyesters A1, A4 and A6 were melted under nitrogen in a vessel equipped with an anchor stirrer, the temperature of the melt was set to 179° C. (in Examles 5 and 6 to 150° C.), and dispersion auxiliaries and finally ethylene polymers were added in the specified amounts (Table 2). After stirring for 25 minutes at 230 r.p.m. the reaction mixture was cooled, styrene in which 2,6-dimethylquinone had been dissolved as inhibitor was then added in portions at from 123° to 130° C., and the dispersions were tested by measuring the viscosity and particle size (light microscopy). The comparison dispersion was very coarse and creamed after a short storage time, so that the viscosity was not measured.

b) Production and testing of wet press-molded laminates

The following mixtures were prepared from the dispersions 3a, 4a, 5a and 6a using a high-speed stirrer:

| 100 parts of dispersion 3a to 6a |
| 100 parts of filler chalk (Millicarb ®) |
| 3.5 parts of zinc stearate |
| 1.5 parts of tert-butyl perbenzoate |

By impregnating five plies of glass fiber mats with a styrene-insoluble bonding agent, laminates were obtained which were press-molded in a steel sheet mold (4×150×150 mm) at 145° C. under 200 bar for 10 minutes and subjected to the falling ball test.

For the purposes of comparison the UP resins A1 and A4 were in each case dissolved in styrene to give a 70% strength solution, stabilized with 200 ppm of 2,6-dimethylquinone and formed into wet press-molded laminates and tested by the falling ball test in a similar manner to the dispersions.

The results in Table 2 show that the laminates according to the invention with a disperse polyethylene phase are less impact-sensitive than laminates based on pure UP resin. Only the comparative laminates exhibited edge cracks immediately after production.

TABLE 2

| Examples | 3 | 4 | Comparative | 5 | 6 | Comparative | Comparative |
|---|---|---|---|---|---|---|---|
| Parts of UP resin | 48.6 A1 | 47.9 A1 | 45.8 A1 | 46.9 A4 | 44.7 A4 | 70 A1 | 70 A4 |
| Parts of dispersant | 0.7 C2 | 2.1 C3 | — | 2.0 C4 | 6.3 C5 | — | — |
| Parts of ethylene polymer | 20.8 B2 | 20.5 B2 | 24.0 B2 | 20.1 B1 | 19.0 B1 | — | — |
| Parts of styrene | 29.9 | 29.5 | 30.2 | 30.0 | 30.0 | 30.0 | 30.0 |
| Parts of dimethylquinone | 0.09 | 0.09 | 0.09 | 0.005 | 0.01 | 0.02 | 0.02 |
| Viscosity [mPa · s] (23° C.) | 8,670 | 10,080 | — | 5,100 | 13,480 | 1,900 | 1,200 |
| Particle diameter [μm] | 15–65 | 10–65 | 200–5,000 | 10–50 | 2–50 | — | — |
| Stability of the dispersion | fairly good | fairly good | poor | very good | very good | — | — |
| Falling ball test | | | | | | | |
| Damage zone [mm] | 17 | 16 | — | 15 | 17 | 23 | 22 |

TABLE 2-continued

| Examples | 3 | 4 | Comparative | 5 | 6 | Comparative | Comparative |
|---|---|---|---|---|---|---|---|
| Damage depth [mm] | 2.0 | 2.0 | — | 2.5 | 2.5 | 3.8 | 3.8 |

Example 7 a) Preparation of a styrene-free polyethylene dispersion 40.8 parts of UP resin A3 were heated to 180° C. under nitrogen in a vessel equipped with an anchor stirrer, and 1.74 parts of dispersant C1 followed by 17.5 parts of ethylene polymer B1 were then added in portions at a stirring rate of 230 r.p.m. The melt temperature fell to 145° C. This temperature was maintained for 20 minutes, then slowly reduced to 110° C., and 15.6 parts of hydroxyethyl methacrylate were added, followed at 81° C. by the addition of 11.1 parts of trimethylolpropane trimethacrylate. The hydroxyethyl methacrylate contained 0.05 part of 2,6-dimethylquinone. The melt was diluted at room temperature with 15 parts of diallyl phthalate.

The finely particulate polyethylene dispersion had a particle size distribution, as determined by light microscopy, of from 2 to 5 μm. The dispersion was stable when stored for many weeks (23° C.) and did not cream.

b) Preparation and testing of a molded material

The following mixture was prepared using a stirrer:

```
100 parts of dispersion 7a
1.5 parts of tert-butyl perbenzoate
3.0 parts of Aerosil ®, amorphous silicic acid
```

The paste was press-molded in a steel mold (roundels 60 mm in diameter and 4 mm deep) for 10 minutes at 145° C. under a pressure of 200 bar.

A crack-free hard molded material of opaque appearance was formed. A scanning electron microscopy photograph (Y) of the fracture surface shows an excellent adhesion of the two phases. The disperse polyethylene phase has been longitudinally deformed by the fracture process, without any detachment or separation occurring at the interface with the coherent UP resin matrix.

Examples 8 and 9

8a) Preparation of the dispersions 47.6 parts of UP resin A2 were heated under nitrogen to 150° C. in a vessel provided with an anchor stirrer, jacket heating and a floor drainage valve, and 2 parts of dispersant C1 followed by 20 parts, in portions, of ethylene polymer B3 were added. The stirring speed was 230 r.p.m. and the melt temperature was adjusted to 168° C. The homogeneous melt was then metered over about 15 minutes through a heated discharge tube into a second stirred vessel, in which 30 parts of styrene containing 0.005 part of 2,6-dimethylquinone as inhibitor had previously been placed, and the reaction mixture was cooled so that the temperature did not rise above 50° C. A finely particulate dispersion was formed having a viscosity of 2,900 [mPa.s] (23° C.) and a particle size distribution of from 2 to 60 μm.

9a) Example 8a was repeated with propylene polymer B4, the melt temperature of the UP resin/polymer mixture being increased to 180° C. before the addition of the mixture to the monomer vessel was begun. The dispersion had a particle size distribution of from 5 to 150 μm and the viscosity (23° C.) was 2,500 [mPa.s].

b) Production and testing of wet press-molded laminates

The following mixtures were prepared from the dispersions 8a and 9a using a high-speed stirrer:

```
100 parts of dispersion
100 parts of filler chalk (Millicarb ®)
3.5 parts of zinc stearate
1.5 parts of tert-butyl perbenzoate
```

The production and testing of the wet press-molded laminates by the falling ball test were performed as described in Examples 3 to 6. The results in Table 3 show that the laminates according to the invention have a lower impact susceptibility than laminates formed from comparable UP resins without a disperse polyolefin phase (cf. Table 2).

TABLE 3

| Wet press-molded laminate | 8b | 9b | 10 |
|---|---|---|---|
| Falling ball test | | | |
| Damage depth [mm] | 2.5 | 2.2 | 1.5 |
| Damage zone [mm] | 17 | 20 | 15 |

Example 10

A VE resin dispersion was prepared by mixing VE resin 5 and polyethylene dispersion 1a in a weight ratio of 1:1. The resultant dispersion was homogeneous and had a viscosity of 780 [mPa.s] (23° C.).

For the production and testing of a wet press-molded laminate, the following mixture was prepared using a high-speed stirrer:

```
100 parts of dispersion
100 parts of filler chalk (Millicarb ®)
3.5 parts of zinc stearate
1.5 parts of tert-butyl perbenzoate
```

The production and testing by the falling ball test were performed in a similar manner to the wet press-molded laminates in Examples 3 to 6. The results in Table 3 show that even at relatively low polyethylene contents, molded materials having a reduced impact susceptibility are produced.

We claim:

1. A curable molding material, comprising
   A. as coherent phase, a free-radical curable, unsaturated polyester resin and
   B. as disperse phase, finely particulate non-crosslinked polyolefin particles,
   wherein the phases A and B are chemically bonded to one another at the interfaces by ionic bonds.

2. A curable molding material as claimed in claim 1, wherein the coherent phase A comprises a polymer or oligomer carrying acidic groups, and the disperse phase B comprises a polymer or oligomer carrying amino groups.

3. A curable molding material as claimed in claim 2, wherein the unsaturated polyester resin itself carries carboxyl terminal groups.

4. A curable molding material as claimed in claim 2, wherein the unsaturated polyester resin is a vinyl ester resin, vinyl ester urethane resin or unsaturated polyester resin without carboxyl groups, which comprises from 2 to 50% by weight, based on A, of an admixed oligomer or polymer carrying acidic groups.

5. A curable molding material as claimed in claim 2, wherein the non-crosslinked polyolefin itself carries aliphatic amino groups.

6. A curable molding material as claimed in claim 2, wherein the non-crosslinked polyolefin comprises from 1 to 40% by weight, based on B, of an admixed oligomeric or polymeric dispersant C carrying aliphatic amino groups.

7. A curable molding material as claimed in claim 6, wherein the dispersant C is a copolymer of ethylene with from 2 to 50% by weight of an acrylate or methacrylate carrying aliphatic amino groups and with a molecular weight ($M_w$) of from 2,000 to 80,000.

8. A curable molding material as claimed in claim 1, wherein the weight ratio of the phases A:B is from 95:5 to 50:50.

9. A curable molding material as claimed in claim 1, comprising from 0.001 to 2.0% by weight of nitrogen bound at least partly in the form of ammonium ions.

10. A curable molding material as claimed in claim 1, wherein the mean particle size of the non-crosslinked polyolefin particles is from 1 to 100 μm.

11. A curable semi-finished product, comprising the molding material as claimed in claim 1, and also conventional additives D.

12. A cured molded part, comprising
A. as coherent phase, a cured polyester resin,
B. as disperse phase, finely particulate non-crosslinked polyolefin particles,
D. conventional additives,
wherein the phases A and B are chemically bound to one another at the interfaces by ionic bonds and thereby adhere firmly to one another.

13. A curable molding material as claimed in claim 1, wherein the mean particle size of the non-crosslinked polyolefin particles is from 3 to 30 μm.

14. A curable molding material as claimed in claim 1 wherein the polyolefin is a polymer of at least 50 mol % ethylene or a polymer of greater than 50 mol % propylene based on the total monomer unit content of the polyolefin.

15. A curable molding material as claimed in claim 1 containing vinyl or allyl comonomers in amount up to 60% by weight of the current phase.

* * * * *

UNITED STATES PATENT AND TRADEMARK OFFICE
CERTIFICATE OF CORRECTION

PATENT NO. : 5,414,043
DATED : May 9, 1995
INVENTOR(S) : Anton HESSE, et al.

It is certified that error appears in the above-indentified patent and that said Letters Patent is hereby corrected as shown below:

On the title page, Item [21], the Application Number should read:

--134,830--

Signed and Sealed this

Eleventh Day of July, 1995

Attest:

BRUCE LEHMAN

*Attesting Officer*     *Commissioner of Patents and Trademarks*